United States Patent
Baset et al.

(10) Patent No.: US 10,423,408 B2
(45) Date of Patent: Sep. 24, 2019

(54) IDENTIFYING AND ISOLATING LIBRARY CODE IN SOFTWARE APPLICATIONS

(71) Applicant: INTERNATIONAL BUSINESS MACHINES CORPORATION, Armonk, NY (US)

(72) Inventors: Salman A. Baset, New York, NY (US); Shih-Wei Li, New York, NY (US); Omer Tripp, Bronx, NY (US); Philippe Suter, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 43 days.

(21) Appl. No.: 15/171,863

(22) Filed: Jun. 2, 2016

(65) Prior Publication Data

US 2017/0351597 A1 Dec. 7, 2017

(51) Int. Cl.
*G06F 8/75* (2018.01)

(52) U.S. Cl.
CPC ........................... *G06F 8/75* (2013.01)

(58) Field of Classification Search
CPC ............ G06F 11/3466; G06F 11/3409; G06F 11/3419; G06F 11/3668; G06F 8/75
USPC ........................................................ 717/127
See application file for complete search history.

(56) References Cited

U.S. PATENT DOCUMENTS

| 7,321,988 | B2 | 1/2008 | Guo et al. |
| 8,321,942 | B1 * | 11/2012 | Chiueh ................. G06F 21/564 726/22 |
| 8,700,880 | B2 | 4/2014 | Trumbull |
| 8,707,294 | B2 | 4/2014 | Bajaj et al. |
| 8,910,148 | B2 | 12/2014 | Bowyer et al. |
| 9,122,490 | B2 | 9/2015 | Fanning et al. |
| 9,229,995 | B2 | 1/2016 | Sekharan |
| 2007/0157178 | A1 * | 7/2007 | Kogan ..................... G06F 8/443 717/130 |
| 2007/0168742 | A1 | 7/2007 | Wadsworth et al. |

(Continued)

OTHER PUBLICATIONS

Qiu et al.; "Using Reduced Execution Flow Graph to Identify Library Functions in Binary Code," IEEE Transactions on Software Engineering, vol. 42, Issue 2, Aug. 2015.

(Continued)

*Primary Examiner* — Bing Zhao
*Assistant Examiner* — Hui-Wen Lin
(74) *Attorney, Agent, or Firm* — Intelletek Law Group, PLLC; Gabriel Daniel, Esq.

(57) ABSTRACT

A computer system, method, and computer readable product are provided for identifying and isolating library code that has been obfuscated in software applications. A call graph is created for the execution of at least one module of preexisting library code within a bundle of software modules through either static analysis of the software code or dynamic analysis of the executing code, and then one or more anchor points are devised based upon the call graph that are indicative of the preexisting library code. Then a bundle of software modules can be analyzed or its execution monitored to determine if a discrete module of library code is present in the executing bundle based upon the modules' interaction with the one or more anchor points, and the discrete module of library code in the executing bundle can be identified as a module of preexisting library code.

15 Claims, 3 Drawing Sheets

(56) References Cited

U.S. PATENT DOCUMENTS

| | | |
|---|---|---|
| 2009/0199171 A1 | 8/2009 | Roe et al. |
| 2012/0131540 A1* | 5/2012 | Mendis .................... G06F 8/77 |
| | | 717/101 |
| 2013/0014274 A1 | 1/2013 | Goodes et al. |
| 2014/0157422 A1 | 6/2014 | Livshits et al. |
| 2015/0161393 A1* | 6/2015 | Pistoia ................. G06F 21/577 |
| | | 726/25 |
| 2015/0199261 A1 | 7/2015 | Paveza et al. |
| 2015/0339140 A1 | 11/2015 | Murray et al. |
| 2016/0042180 A1* | 2/2016 | Sayre ................... G06F 21/563 |
| | | 726/23 |

OTHER PUBLICATIONS

Raychev et al., "Predicting Program Properties from 'Big Code'," Symposium on Principles of Programming Languages, Jan. 15-17, 2015, Mumbai, India.

* cited by examiner

IDENTIFYING AND ISOLATING LIBRARY CODE IN SOFTWARE APPLICATIONS

BACKGROUND

The present application relates to programming code. More specifically, the present application relates to a computerized system and methodology to identify and isolate intentionally obfuscated library code and modules in software applications.

There are many computer software languages that include library modules within their source code that perform functions when called in an executing software application. For example, computer applications written in JAVA® software code, such as the Android operating system, are distributed with a set of library modules, especially with the software development kits provided to third party application programmers. The library code modules allow programmers simple access to the functionality inherent in the modules' programming language without needing to spend time to recreate the functionality in a new program.

Some programmers and software application vendors use open source or other existing library code but then intentionally obfuscate the modules of the application and library code, rendering them indistinguishable from each other. Once the application and library code have been obfuscated, it is very hard to distinguish the library code from the application code.

SUMMARY

According to an embodiment of the present disclosure, a computer system, method, and computer readable product are provided for identifying and isolating library code that has been purposefully obfuscated in software applications. A call graph is determined for at least one module of preexisting library code within a bundle of software modules, which allows the determination of one or more anchor points. The presence of the anchor points in a bundle of target software modules allows from static analysis of the software code or monitoring of the execution of the modules with the anchor points to indicate that the preexisting library code is present in at least one of the modules. Thus, by determining or monitoring the path of a bundle of software modules, a determination can be made as to whether a discrete module of library code is a known module based upon the interaction of the modules with the one or more anchor points. A discrete module of code in the executing bundle can then be identified as a module of preexisting library code.

In one embodiment, one or more anchor points can be created from a model of execution of an application utilizing at least one module of preexisting library code such that the one or more anchor points are a unique signature for the execution of at least one module of preexisting library code within a bundle of executing modules. Alternately, determination of the one or more anchor points can be based upon establishing a call frequency of the at least one module of preexisting library code within a bundle of software modules executing within a software application.

In another embodiment, a call graph can also be created for the executing bundle of software modules. The determination as to whether a discrete module of library code is present in the executing bundle is based upon a comparison of the one or more anchor points of at least one call graph for the execution of at least one module of preexisting library code and the call graph of the executing bundle of software modules. The call graphs can be compared through isomorphism. The call graphs can also be stored in a call graph library to be retrievable for comparison.

In a further embodiment, a dependency network of the at least one module of preexisting library code can be created with respect to one or more other modules of preexisting library code. Furthermore, a colored call graph can be created and used for the comparison between software modules and isomorphism.

DETAILED DESCRIPTION

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. Rather, these exemplary embodiments are provided so that this disclosure will be thorough and complete and will fully convey the scope of the present disclosure to those skilled in the art. In the description, details of well-known features and techniques may be omitted to avoid unnecessarily obscuring the presented embodiments.

Figure 1:
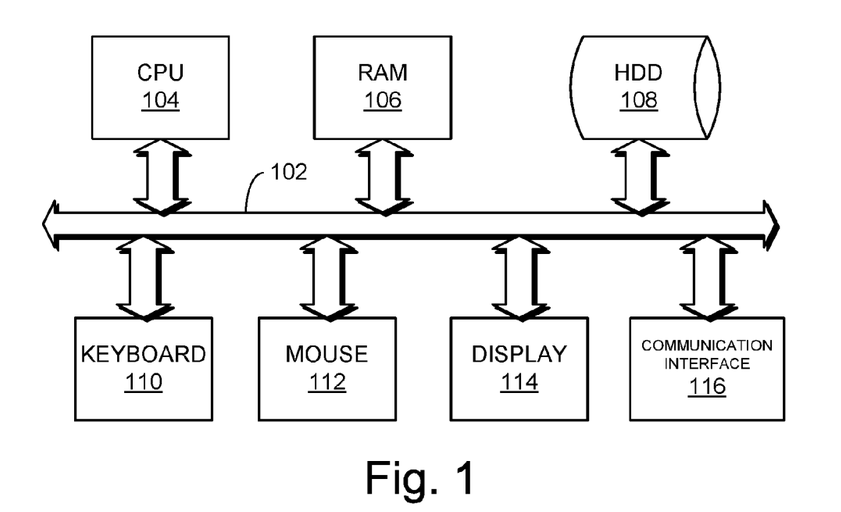
FIG. 1 is a block diagram that shows examples of hardware used according to one embodiment of the present disclosure.

As shown in FIG. 1, a block diagram illustrates computer hardware utilized to realize the system configuration and processing of the present disclosure. CPU (central processing unit) 104, RAM (main memory) 106, HDD (hard disk drive) 108, Keyboard 110, Mouse 112 and Display 114 are connected to a system bus 102. CPU 104, in an embodiment of the present disclosure, is preferably based on a 32-bit or 64-bit architecture. For example, Pentium™ 4 from Intel®, Core™ 2 Duo from Intel®, or Athlon™ from AMD can all be used. RAM 106, in an embodiment of the present disclosure, normally has a storage capacity of at least 2 GB-4 GB.

In FIG. 1, HDD 108, in an embodiment of the present disclosure, has capabilities that include storing a program that can execute the processes described herein. For example a program, such as Apache™, can be stored for operating the system as a Web server. HDD 108, in an embodiment of the present disclosure, can store an executing application that includes one or more library software modules, such as those for the Java™ Runtime Environment program for realizing a JVM (Java™ virtual machine).

Figure 2:
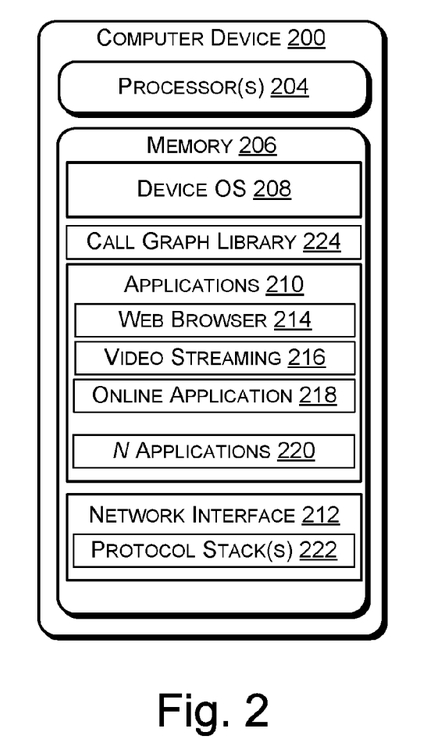
FIG. 2 is a representative diagram of computer components that identify and isolate library code from software applications.

Additionally, in FIG. 1, a Keyboard 110 and Mouse 112 can be used to manipulate graphic objects, such as icons, task bars and text boxes displayed on Display 114 in accordance with the graphic user interface provided by a device operating system (OS) 208 in FIG. 2. Display 114, in FIG. 1, in one embodiment of the present disclosure, is a 32-bit true color LCD monitor with a resolution of at least 1024×768. Display 114 is used, for example, to display the results of operations performed by an application program executed, such as a software application being executed in a JVM.

Communication Interface 116, in FIG. 1, in one embodiment, is connected to a network using the Ethernet® protocol. In the present disclosure, Communication Interface 116 receives processing requests in accordance with a communication protocol, for example TCP/IP, from a another computer (not shown) using functions provided by a program, for example in one embodiment, Apache, and processing results are sent to the another computer (not shown).

FIG. 2 illustrates exemplary components of a computer device 200 that can identify and isolate library code executing thereupon. The computer device 200 may include one or more processor(s) 204, and a memory 206 storing a device OS 208, various software applications 210 configured to request/receive data over the network, and a network interface module 212.

In various embodiments, the applications 210 stored at the computer device 200 may include, but are not limited to, a web browser application 214, a video streaming application 216, an online application 218, and so on, through an Nth software application 220. During execution on the computer device 200, each of the applications 210 may be configured to cause the computer device 200 to initiate data communications with other devices across the network.

The computer device 200 may be also configured to communicate over a telecommunications network using any common wireless and/or wired network access technology. Moreover, the computer device 200 may be configured to run any compatible device OS, including but not limited to, Microsoft Windows Mobile®, Google Android®, Apple iOS®, Linux Mobile®, as well as any other common mobile device OS. The resident device OS 208 will have one or more resident diagnostic applications or tools, such as Android Debug Bridge, that can be executed to generated diagnostic information for the computer device 200.

Each of the one or more processor(s) 204 can include one or more central processing units (CPUs) having multiple arithmetic logic units (ALUs) that perform arithmetic and logical operations, as well as one or more control units (CUs) that extract instructions and stored content from processor cache-level memory, and then executes instructions by calling on the ALUs during program execution. In an implementation, the processor(s) 204 may be configured to execute each of the software applications 210 stored in the memory 206. In various embodiments, the network interface module 212 may be configured to detect an action (e.g., operation, command, user input) directed to one of the applications 210, the action triggering the generation of a data transfer request and a transmission of the data transfer request.

The memory 206 may be implemented using computer readable media, such as computer storage media. In various embodiments, the memory 206 may store a virtual computer device. In various embodiments, the multiple layers may also correspond to the Internet Protocol (IP) suite. For example, in various embodiments, the computer device 200 may execute a program on each of a physical layer, a data link/radio layer, a network layer/Internet layer, a transport layer, a session layer, a presentation layer, and an application layer, as a data packet is generated and configured amongst the layers for communication from the computer device 200 to the other computer devices.

Also shown in FIG. 2 is an example of the computer device 200 having a resident call graph library 224 that allows for the storage and quick retrieval of call graphs (like the call graph of know library functions in FIG. 5A) for comparison with executing bundles of software. Once call graphs are created as further described herein, then can be stored in the call graph library 224 in either temporary or permanent manner. Moreover, the call graph library 224 can also be remotely located and accessible to the computer device 200 and a staged-storage of call graphs may be used with more likely used call graphs being stored in resident memory 206 while less likely call graphs are stored at a remote database, such as database 108 in FIG. 1.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. For example, the computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
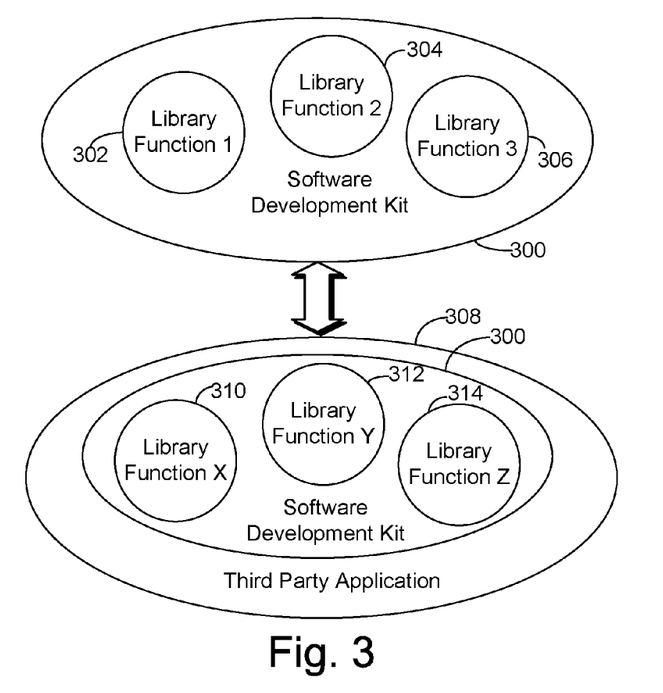
FIG. 3 is an object diagram illustrating a third party application that is constructed with a software development kit with the native library functions of the software development kit being obfuscated within the third party application.

FIG. 3 is an object diagram illustrating an application 308 constructed with a software development kit 300, like that used with JAVA or C++, that has a bundle of library functions embodied as software modules 302, 304, and 306. Here, each library function module of the software development kit 300 performs a specific known function in an executing software application that is programmed with the kit 300. For example, library function 1, 302, can be a math function, library function 2, 304, can be a graphics function, and library function 3, 306, can be a database constructor. Examples of JAVA standard libraries are java.lang, java.io, java.math, java.util, and java.swing. Examples of C++ libraries are <utility>, <cstdlib>, <functional>, and <memory>.

A programmer may then take the software development kit 300 and utilize it with the library functions to create a third party application 308 that incorporates some or all of the tools of the software development kit 300. In this example, the third party programmer has intentionally changed the name of the library function associated with modules 302, 304, and 306 to be library function X, 310, library function Y 312, and library function Z 314. The programmer may intentionally change the name for a variety of reasons, such as to make reverse engineering of the application difficult, or to align the library modules with the name calls made by other modules of the third party application 308. Consequently, a person wanting to interact with and understand the construction of the third party application 308 would be unable to call up, identify, and isolate the specific code that comprises a library function due to the module name obfuscation.

Figure 4:
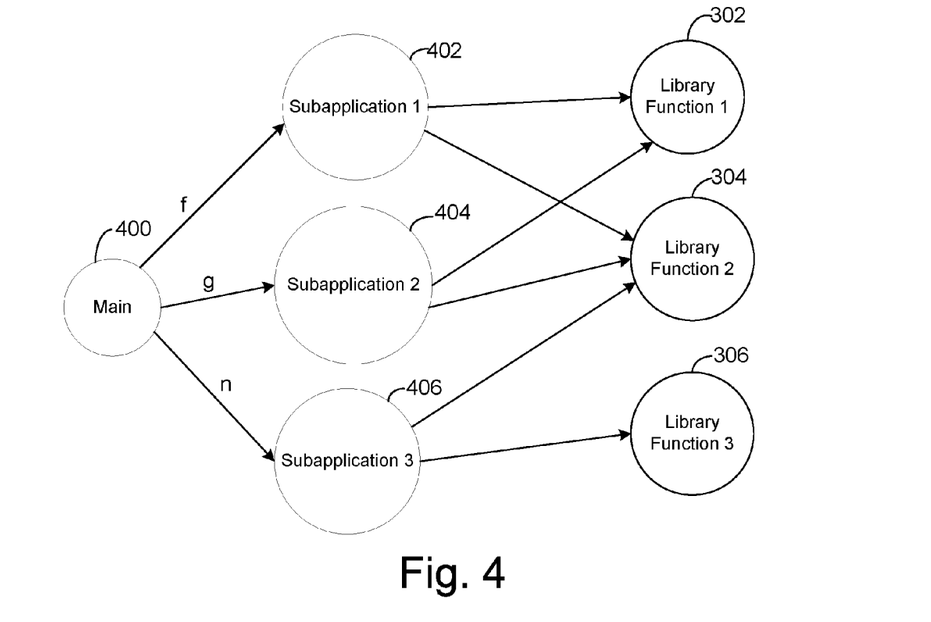
FIG. 4 is an object diagram illustrating a basic dependency network of software modules.

FIG. 4 is an object diagram illustrating a call graph of the software modules of a typical application made with the software development kit 300. A call graph is a directed graph, sometimes referred to as a flow graph, that represents calling relationships between subroutines in an executing computer program. Specifically, each node, such as main 400 or subapplication 1, 402, represents a procedure and each edge (f, g . . . n) indicates that one procedure, function, or module calls for the action of another. A "cycle" in the graph can be linear or recursive procedure calls. A dependency network is one form of a call graph indicating software modules that are called by other software modules.

Call graphs are used for basic program analysis to understand the flow of modules with the execution of computer programs. They can be used to analyze the flow of values between procedures or the dependency between modules. One common application of call graphs is to find procedures that are not called in a program and are wasted storage space.

Call graphs can be created through a static analysis, such as analyzing software code to determine the call flow of the modules. The static analysis can be done using extant computer tools that analyze code, often to determine if any errors or bugs are present in the software code prior to implementation and execution. Alternately, the call graph can be created from monitoring the execution of software modules wherein the specific calling of the modules for execution, and by which other modules, is monitored to link the modules in a related manner to create a graph, like that shown in FIG. 4.

In the call graph of FIG. 4, the main program 400 calls one of subapplication 1, 402, subapplication 2, 404, and subapplication 3, 406, which will each in turn selectively call the known library functions, library function 1, 302, library function 2, 304, and library function 3, 306, as needed in execution. The overall calls, either linearly or recursively, create a call graph having a unique signature of calls. Thus, the frequency with which the various library modules are called can be used to determine the anchor point subapplication. If the subapplications are known applications, such as other library functions, common graphics application, common operation system modules, etc., then they can serve as anchor points for the call graph to create a uniform graph that can be compared with for isomorphism to determine the identify of library functions.

Figure 5A:
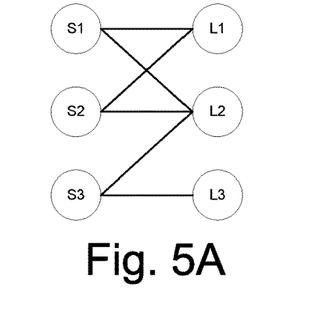
FIG. 5A is an ordered call graph of the known library functions of a development library.

For example, FIG. 5A is a call graph of the known library functions L1, L2, and L3 as they are called by the known subapplications, S1, S2, and S3, as shown in FIG. 4. The edges of the graph here show that S1 calls L1 and L2, but not L3, that S2 calls L1, L2, but not L3, and that S3 only calls L2 and L3. Thus, with S1, S2 and S3 as anchor points, a calling graph unique to L1, L2 and L3 can be created. The call graph can be created from the static or dynamic analysis of software code of a known library code.

In graph theory, an isomorphism of two graphs G and H is a bijection between the vertex sets of G and H, f:V(G) →V(H) such that any two vertices u and v of G are adjacent in G if and only if f(u) and f(v) are adjacent in H. Consequently, a similar call graph can be made to that of FIG. 5A if the subapplications S1, S2 and S3 are known as anchor points executing within the bundle of software modules, such as the third party application 308 of FIG. 3.

Figure 5B:
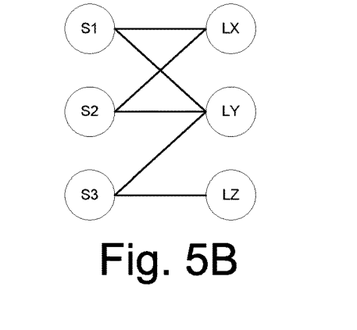
FIG. 5B is a call graph of an executing bundle of modules that is isomorphic to the call graph of FIG. 5A.

Thus, a call graph can be created for the anchor points of third party application 308 that can be compared to the call graph of FIG. 5A for isomorphism. FIG. 5B is a call graph that can be created from the monitoring of the executing software bundles of the third party application 308, or from a static analysis of the software code of the third party application 308 With reference to the known anchor points of the subapplications, S1, S2 and S3, the library functions that were relabeled LX (library function X 310) LY (library function Y 312) and LZ (library function Z 314) can be mapped into the graph. It can thus be seen that the call graph of FIG. 5B is isomorphic to the call graph of FIG. 5A, and therefore, that LX=L1, LY=L2, and LZ=L3. Consequently, a reviewer of the third party application 308 can identify and isolate the known library function X 310 as known library function 1, 302, to reverse engineer and/or modify the third party application 308.

It should also be appreciated that the call graphs of FIGS. 5A and 5B, and that are otherwise described herein, can be a multivariate or "colored" graph as well. Graph coloring, as known in the art, is assigning labels called "colors" to elements of a call graph. The vertices can be colored such that no two adjacent vertices share the same color, and/or a color can be assigned to each edge so that no two adjacent edges share the same color. Furthermore, a "face" coloring of a planar graph assigns a color to each region so that no two "faces" that share a boundary have the same color. Through the use of a colored graph where different attributes of the software modules and their calls are represented through the use of coloring, colored graph isomorphism can be used to determine the presence of the library software modules. A k-coloring scheme as known in the art can be used herein for k attributes of the code.

Figure 6:
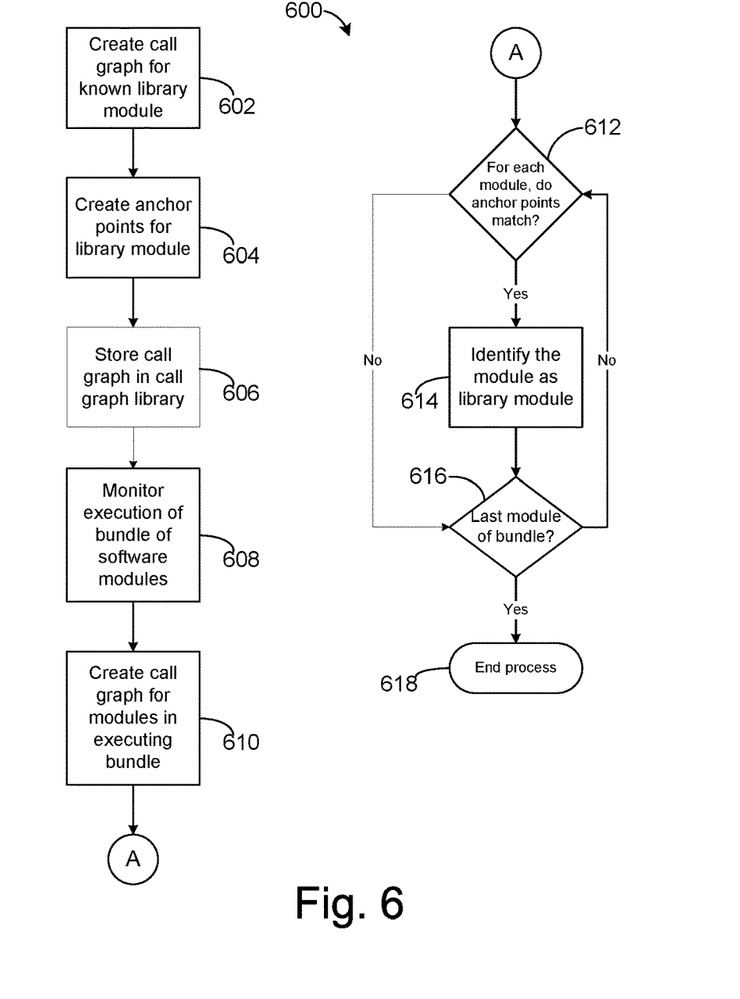
FIG. 6 is flowchart of one process of identifying library code from the library functions being a called as modules in an executing bundle of modules within a software application.

FIG. 6 is a flowchart of one process 600 of identifying library code by identifying the library functions (such as library functions 302, 304, and 306) being called as modules in an executing bundle of modules within a software application, such as third party application 308. The process starts with a call graph being created for a known library function and corresponding code, as shown at step 602. The process can be carried out on the computer device 202 that is executing a known program with library functions, such as library functions 302, 304, and 306. An example of the call graph that can be created at step 602 is that shown in FIG. 4. The creation of the call graph here can be done via a static analysis of library code or a dynamic analysis of the library code's execution. Then the anchor points for the call graph are determined as shown in step 604. The anchor points can be the subapplications 402, 404, and 406 or other known modules or code that would likely be common in a call graph between test executing application, like that shown in FIG. 4, and a third party application 308 using a known set of library modules, such as those of a software development kit 300.

The call graph can then be stored in call graph library, as shown at step 606. The storage can be locally at the devices, such as in call graph library 224 in FIG. 2, or can be remotely from the computer device 200. Furthermore, the step of storing the call graph can occur at any time after its creation and in the process of FIG. 6, not just as shown at step 606.

In this embodiment, the execution of a bundle of software applications is then monitored, as shown in a step 608, such as monitoring the execution of the third party development application 308. A call graph is then created for the for the software modules of the executing bundle, as shown at step 610, such as creating the call graph of FIG. 5B. Alternately, rather than monitoring the third party application 308, a static analysis can be performed on the third party application 308 to obtain a call graph for it. Then a determination is made as to whether each of the known modules have their respective anchor points match, as shown at decision 612. For example, does S1=L1 match S1=LX as between the call graphs of FIGS. 5A and 5B? Each anchor point S1, S2 and S3 can be iterated through to determine the library modules present in the third party application 308. If embodied with colored graphs utilized for the call graphs, all k attributes of the colored call graphs can be compared.

If the anchor points do not match at decision 612, then a determination is made as to whether the last software module of the bundle has been reached, as shown at decision 616. Otherwise, if the anchor points match at decision 612, the library module corresponding to the one or more anchor points is identified, as shown at step 614. Then a determination is made as to whether the last module of the bundle has been compared, as shown at decision 616. If the last module has not been reached at decision 616, then the process returns to compare the next module, as shown at decision 612. Otherwise, if the last module has been reached at decision 616, then the process to identify the library modules (or functions), then the process terminates as shown at terminator 618.

It should be appreciated that the decision 612 can likewise iterate through multiple stored call graphs of known library functions, such as that shown FIG. 5A, beyond getting one specific match. Iteration can be through the full library set of call graphs in the call graph library 224 to give the more thorough review of the executing bundle, and multiple matches of the call graphs can therefore occur. This can happen when the library function itself may contain other library functions as subroutines or embedded functions. Further, known heuristics can be utilized to determine how to interpret multiple matches with call graph of a known library function (e.g., FIG. 5A). In such instance, a further comparison of another call graph of a library function can be used if it is know that the first match may be indicative of a specific potential embedded library function that the library function of the first match is used for. Additionally, the existence of other matches of known library modules from the review of the executing bundle can also be used to indicate that the multiply-matched executing bundle is more likely one specific library function than another. For example, the presence of one known library function of a common development kit may indicate that another multiply-matched executing bundle is more likely a library function from that same known development kit.

It should further be appreciated that the number of anchor points that can be created and used are not limited, and the number can be dynamically changed through the examination of the third party application 308. For example, the presence of one anchor point may indicate that other specific anchor points should be added to the call graph for comparison. Further, the process of FIG. 6 can be used to identify specific bundles of application code if desired, rather than the higher level software object of the library module.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. Rather, these exemplary embodiments are provided so that this disclosure will be thorough and complete and will fully convey the scope of the present disclosure to those skilled in the art. In the description, details of well-known features and techniques may be omitted to avoid unnecessarily obscuring the presented embodiments.

What is claimed is:

1. A computer implemented method of identifying and isolating library code in software applications, comprising:
    identifying, by the computer, a call graph of at least one module of preexisting library code;
    determining, by the computer, one or more anchor points based upon the call graph of the at least one module of preexisting library code;
    obtaining, by the computer, a call graph of a bundle of software modules;
    determining if a discrete module of library code is present in the bundle of software modules based on a call graph comparison and the anchor points therebetween; and
    if present, based upon the call graph comparison, identifying the discrete module of library code in the bundle of software modules as a module of preexisting library code,
    wherein determining one or more anchor points is based upon establishing a call frequency of the at least one module of preexisting library code within the bundle of software modules,
    wherein determining if a discrete module of library code is present in the bundle of software modules includes the computer comparing isomorphism with the call graph of the at least one module of preexisting library code,
    wherein isomorphism includes having same edges and vertices between the call graph of the at least one module of preexisting library code and the call graph of the bundle of software modules, and
    wherein a number of anchor points is dynamically changed based on a presence of an anchor point indicating that other anchor points should be added.

2. The method of claim 1, wherein determining the call graph of preexisting library code and bundle of software modules occurs through static analysis of the software code.

3. The method of claim 1, wherein determining the call graph of preexisting library code and bundle of software module occurs through dynamic analysis by monitoring the execution of the software code.

4. The method of claim 1, wherein determining the call graph comprises creating a colored graph utilizing parameters of the software code.

5. The method of claim 1, further comprising providing a staged storage of call graphs, where call graphs that are more likely to be used are stored in a resident memory of the computer, while call graphs that are less likely to be used are stored at a remote database.

6. A computer system for identifying and isolating library code in software applications, the computer system comprising:
    one or more processors, one or more non-transitory computer-readable storage devices, one or more computer-readable tangible storage devices, and program instructions stored on at least one of the one or more storage devices for execution by at least one of the one or more processors via at least one of the one or more storage devices, wherein the computer system is configured to:
    identify a call graph of at least one module of preexisting library code;
    determine one or more anchor points based upon the call graph of the at least one module of preexisting library code;
    obtain a call graph of a bundle of software modules;
    determine if a discrete module of library code is present in the software modules based on a call graph comparison and the anchor points therebetween; and
    if present based upon the call graph comparison, identify the discrete module of library code in the bundle of software modules as a module of preexisting library code,
    wherein determining one or more anchor points is based upon establishing a call frequency of the at least one module of preexisting library code within the bundle of software modules,
    wherein determining if a discrete module of library code is present in the bundle of software modules includes comparing isomorphism with the call graph of the preexisting library code,
    wherein isomorphism includes having same edges and vertices between the call graph of the at least one module of preexisting library code and the call graph of the bundle of software modules, and wherein a number of anchor points is dynamically changed based on a presence of an anchor point indicating that other anchor points should be added.

7. The computer system of claim 6, wherein the computer system is further configured to determine the call graph of preexisting library code and bundle of software modules through static analysis of the software code.

8. The computer system of claim 6, wherein the computer system is further configured to determine the call graph of preexisting library code and bundle of software modules through dynamic analysis by monitoring the execution of the software code.

9. The computer system of claim 6, wherein the computer system is further configured to determine a call graph by creating a colored graph utilizing parameters of the software code.

10. The computer system of claim 6, wherein the computer system is further configured to create a dependency network of the at least one module of preexisting library code with respect to one or more other modules of preexisting library code.

11. A computer program product for identifying and isolating library code in software applications, the computer program product comprising a computer readable storage medium having programming instructions embodied therewith, the program instructions executable by a computer to cause the computer to:

identify a call graph for at least one module of preexisting library code;

determine one or more anchor points based upon the call graph of the at least one module of preexisting library code;

obtain a call graph of a bundle of software modules;

determine if a discrete module of library code is present in the software modules based on call a graph comparison and the anchor points therebetween; and if present based upon the call graph comparison, identify the discrete module of library code in the bundle of software modules as a module of preexisting library code, wherein determining one or more anchor points is based upon establishing a call frequency of the at least one module of preexisting library code within the bundle of software modules, wherein determining if a discrete module of library code is present in the bundle of software modules includes comparing isomorphism with the call graph of the at least one module of preexisting library code, wherein isomorphism includes having same edges and vertices between the call graph of the at least one module of preexisting library code and the call graph of the bundle of software modules, and wherein a number of anchor points is dynamically changed based on a presence of an anchor point indicating that other anchor points should be added.

12. The computer program product of claim 11, wherein the program instructions executable by a computer to further cause the computer to determine the call graph of preexisting library code and bundle of software modules through static analysis of the software code.

13. The computer program product of claim 11, wherein the program instructions executable by a computer to further cause the computer to determine the call graph of preexisting library code and bundle of software module through dynamic analysis by monitoring the execution of the software code.

14. The computer program product of claim 11, wherein the program instructions are executable by a computer to further cause the computer to determine a call graph by creating a colored graph utilizing parameters of the software code.

15. The computer program product of claim 11, wherein the program instructions are executable by a computer to further cause the computer to create a dependency network of the at least one module of preexisting library code with respect to one or more other modules of preexisting library code.

* * * * *